C. E. ANDERSON.
NUT LOCK.
APPLICATION FILED MAY 8, 1918.
1,279,962.
Patented Sept. 24, 1918.
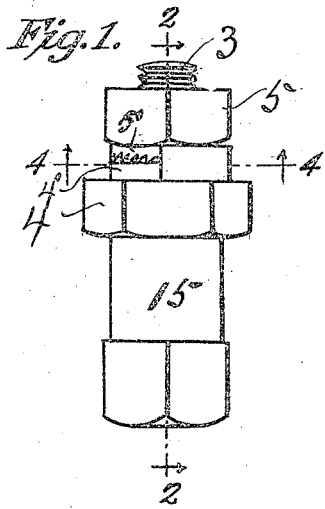
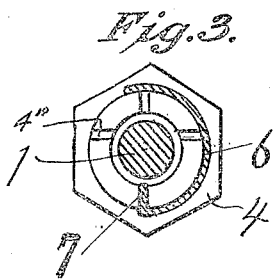
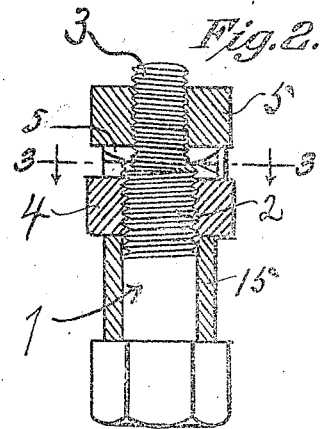
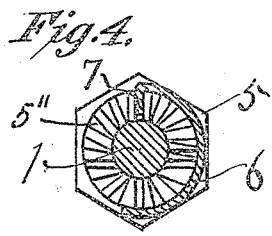
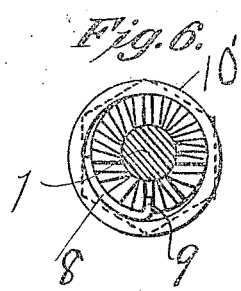
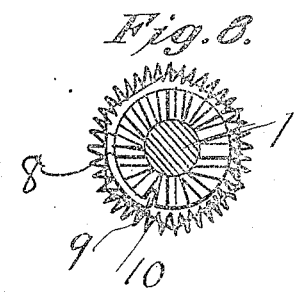
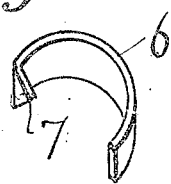
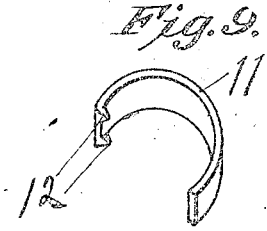
INVENTOR
Carl E. Anderson,
WITNESSES
James F. Crown,
S. M. McColl
BY Richard Owen,
ATTORNEY

UNITED STATES PATENT OFFICE.

CARL E. ANDERSON, OF DULUTH, MINNESOTA.

NUT-LOCK.

1,279,962.  Specification of Letters Patent.  Patented Sept. 24, 1918.

Application filed May 8, 1918. Serial No. 233,336.

*To all whom it may concern:*

Be it known that I, CARL E. ANDERSON, a citizen of the United States, residing at Duluth, in the county of Saint Louis and State of Minnesota, have invented certain new and useful Improvements in Nut-Locks, of which the following is a specification.

This invention relates to nut locks, and more particularly to that type in which is employed a bolt with right and left threads, and two nuts engaged with the threads, and means for locking the nuts together.

The object of the invention is to provide simple and efficent means for locking a pair of nuts against separation on a bolt.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a nut lock constructed in accordance with this invention, Fig. 2 is a longitudinal section thereof taken on the line 2—2 of Fig. 1.

Fig. 3 is a transverse section taken on the line 3—3 of Fig. 2.

Fig. 4 is a similar view taken on the line 4—4 of Fig. 1.

Fig. 5 is a detail perspective view of the spring used in connection with the form of the device shown in Figs. 1 to 4.

Fig. 6 is an end view showing a slightly different form of the invention.

Fig. 7 is a detail perspective view of the spring used in the form shown in Fig. 6.

Fig. 8 is an end view showing another form of the invention, and

Fig. 9 is a detail perspective view of the spring used in the form shown in Fig. 8.

In the embodiment illustrated a bolt 1 is shown having a right hand thread 2 and a reduced terminal 3 provided with a left hand thread. For coöperation with these threaded portions of the bolt are two nuts 4 and 5, one being the right hand one and the other the left. The right nut 4 is provided with a reduced extension 4′ having notches 4″ opening through the edge thereof, any desired number of which may be employed. The inner or opposed face of the nut 5 has an annulus 5′ provided with ratchet teeth 5″.

A semi-circular spring 6 is designed to encircle the notched and ratcheted portions of the two nuts as is shown clearly in Fig. 1 and has a finger 7 extending inwardly at right angles thereto and designed to enter one of the notches 4″ in the nut extension 4′. This finger 7 has its outer face beveled to provide for the ratchet tooth or nut 5 riding thereover when secured into locking direction and which are designed to engage with the inner face of said tooth or finger to prevent turning in the opposite direction. It will thus be seen that when the spring 6 encircles the notched and ratcheted extensions of the two nuts the finger 7 entering the notch 4″, the two nuts will be locked against separation as one nut must be turned in one direction and the other in the opposite direction to affect their removal.

To remove the nuts, the spring 6 is first disengaged by inserting a suitable implement under the free end thereof and then the outer nut may be turned off and the inner nut also removed.

In Figs. 6 and 7, a slightly different form of locking element is shown, comprising a segment 8 having a finger or tooth 9 extending at right angles thereto and inward so as to enter one of the notches 4″ of the nut 4 when in operative position and which is held in such position by a coiled spring 10. The same locking element is shown in Fig. 6 and is held in operative position by a rubber ring 10′.

Still another form of locking element is shown at 11 in Figs. 8 and 9 and comprises a spring having laterally spaced fingers 12 at one end which are designed to enter grooves in the peripheries of the extensions of the nuts 4 and 5 to lock them against separation.

From the above description it will be obvious that the locking element necessary to hold the two nuts engaged must have the finger shown at 7 in Figs. 1 to 4, and at 9 in the other figures, and it may be carried either by a semi-circular spring as shown in the first figures mentioned or by other yieldable means such as those shown in the remaining figures.

The foregoing description and the drawings have reference to what may be considered the preferred or approved form of my invention. It is to be understood that I may make such changes in construction and arrangement and combination of parts, materials, dimensions, *et al.*, as may prove expedient and fall within the scope of the claimed invention.

Having thus fully described my invention, what I claim as new and desire to secure by Letters Patent, is:—

1. A nut lock comprising a bolt having right and left threads, right and left nuts for engagement with said threads, the opposed faces of the two nuts being one provided with a reduced peripherally notched extension and the other with ratchet teeth, and a semi-circular member encircling the toothed and notched portions of said nuts, and provided with an inturned finger for insertion in one of said notches.

2. A nut lock comprising a bolt having right and left threads, right and left nuts for engagement with said threads, the opposed faces of the two nuts being one provided with a reduced notched extension and the other with ratchet teeth, a curved member for lapping the joint between and engaging the peripheries of the notched and ratcheted members of the nuts having an inturned finger for entering one of the notches, and resilient means for holding said finger carrying member in operative position.

In testimony whereof I affix my signature in presence of two witnesses.

CARL E. ANDERSON.

Witnesses:
W. D. UNDERHILL,
M. C. NELSON.